US012578514B2

(12) United States Patent
Kweon et al.

(10) Patent No.: US 12,578,514 B2
(45) Date of Patent: Mar. 17, 2026

(54) INFRARED REFLECTOR FOR LIDAR

(71) Applicants: HYUNDAI MOTOR COMPANY,
Seoul (KR); KIA CORPORATION,
Seoul (KR); OPTRONTEC CO., LTD,
Changwon-si (KR)

(72) Inventors: Kyoung-Chun Kweon, Hwaseong-si
(KR); Seon-Yong An, Chuncheon-si
(KR); Wonyoung Kim, Incheon (KR);
Minseok Oh, Changwon-si (KR);
Seongman Wi, Seoul (KR)

(73) Assignees: HYUNDAI MOTOR COMPANY,
Seoul (KR); KIA CORPORATION,
Seoul (KR); OPTRONTEC CO., LTD,
Changwon-Si (KR)

( * ) Notice: Subject to any disclaimer, the term of this
patent is extended or adjusted under 35
U.S.C. 154(b) by 860 days.

(21) Appl. No.: 17/889,058

(22) Filed: Aug. 16, 2022

(65) Prior Publication Data

US 2023/0341595 A1 Oct. 26, 2023

(30) Foreign Application Priority Data

Apr. 22, 2022 (KR) ......................... 10-2022-0050288

(51) Int. Cl.
*G02B 5/08* (2006.01)
(52) U.S. Cl.
CPC .................................. *G02B 5/0816* (2013.01)
(58) Field of Classification Search
CPC .................................................... G02B 5/0816
USPC ......................................................... 359/584
See application file for complete search history.

(56) References Cited

U.S. PATENT DOCUMENTS

| | | | | |
|---|---|---|---|---|
| 5,579,162 A | * | 11/1996 | Bjornard | ................ G02B 1/116 |
| | | | | 359/359 |
| 6,250,764 B1 | * | 6/2001 | Aoki | .................... G02B 27/283 |
| | | | | 353/34 |
| 10,914,961 B2 | | 2/2021 | Hendrix | |
| 2007/0211344 A1 | * | 9/2007 | Setoguchi | ............ G02B 27/144 |
| | | | | 359/582 |
| 2012/0026580 A1 | | 2/2012 | Kiyoto | |

(Continued)

FOREIGN PATENT DOCUMENTS

| | | |
|---|---|---|
| CN | 110228236 A | 9/2019 |
| JP | 2010-026030 A | 2/2010 |

(Continued)

*Primary Examiner* — Sharrief I Broome
(74) *Attorney, Agent, or Firm* — MCDONNELL
BOEHNEN HULBERT & BERGHOFF LLP

(57) ABSTRACT

The present disclosure provides an infrared reflector for a
LIDAR, the infrared reflector including a substrate, and a
multilayer dielectric film deposited on the substrate, in
which the multilayer dielectric film includes a first plurality
of low-refractive layers each having a relatively lower
refractive index than a high-refractive layer, and a second
plurality of low-refractive layers each having a relatively
lower refractive index than the low-refractive layer, and the
first plurality of low-refractive layers and the second plu-
rality of low-refractive layers are alternately and repeatedly
stacked. According to the present disclosure, the infrared
reflector may be independent of an incident angle, i.e., have
high reflectance while having the reflectance that does not
vary depending on the incident angle.

18 Claims, 14 Drawing Sheets

· Reflect Mirror Coating Schematic Diagram

(56)         References Cited

U.S. PATENT DOCUMENTS

| | | | | |
|---|---|---|---|---|
| 2012/0145901 A1* | 6/2012 | Kakiuchi | ............... | G02B 5/208 |
| | | | | 359/359 |
| 2012/0268809 A1* | 10/2012 | Guo | ....................... | G02B 5/201 |
| | | | | 359/359 |
| 2014/0014838 A1 | 1/2014 | Hendrix et al. | | |
| 2016/0231483 A1 | 8/2016 | Hendrix et al. | | |
| 2017/0254936 A1* | 9/2017 | Morita | .................... | B32B 37/02 |
| 2018/0067212 A1* | 3/2018 | Wilson | .................... | H04M 1/02 |
| 2018/0231791 A1 | 8/2018 | Hendrix et al. | | |
| 2018/0372951 A1 | 12/2018 | Tashiya et al. | | |
| 2019/0285785 A1 | 9/2019 | Ockenfuss et al. | | |
| 2020/0341122 A1 | 10/2020 | Ahn et al. | | |
| 2021/0055462 A1* | 2/2021 | Kweon | .................. | G02B 5/208 |
| 2023/0314669 A1* | 10/2023 | Anzai | ............... | B32B 17/10036 |
| | | | | 349/96 |

FOREIGN PATENT DOCUMENTS

| | | | |
|---|---|---|---|
| JP | 2012-032454 A | 2/2012 |
| KR | 2015-0031336 A | 3/2015 |
| KR | 2018-0032620 A | 3/2018 |
| KR | 2018-0093805 A | 8/2018 |
| KR | 2020-0124377 A | 11/2020 |
| KR | 2021-0023565 A | 3/2021 |
| KR | 2021-0030526 A | 3/2021 |

* cited by examiner

▶ INCIDENT ANGLE : $\theta_2 > \theta_1$
　RECEIVED SIGNAL : $S_2 < S_1$

· Reflect Mirror Coating Schematic Diagram

FIG. 4

| Layer | Material | Physical Thickness (nm) | | |
|---|---|---|---|---|
| Substrate | Glass | | | |
| 1 | SiO2 | 188.33 | ~ | 288.33 |
| 2 | TiO2 | 60.22 | ~ | 160.22 |
| 3 | SiO2 | 150.95 | ~ | 250.95 |
| 4 | TiO2 | 62.46 | ~ | 162.46 |
| 5 | SiO2 | 138.96 | ~ | 238.96 |
| 6 | TiO2 | 64.03 | ~ | 164.03 |
| 7 | SiO2 | 144.01 | ~ | 244.01 |
| 8 | TiO2 | 65.85 | ~ | 165.85 |
| 9 | SiO2 | 156.24 | ~ | 265.24 |
| 10 | TiO2 | 68.73 | ~ | 168.73 |
| 11 | SiO2 | 141.48 | ~ | 241.48 |
| 12 | TiO2 | 69.14 | ~ | 169.14 |
| 13 | SiO2 | 125.66 | ~ | 225.66 |
| 14 | TiO2 | 69.46 | ~ | 169.46 |
| 15 | SiO2 | 119.34 | ~ | 219.34 |
| 16 | TiO2 | 69.38 | ~ | 169.38 |
| 17 | SiO2 | 117.12 | ~ | 217.12 |
| 18 | TiO2 | 68.52 | ~ | 168.52 |
| 19 | SiO2 | 117.02 | ~ | 217.02 |
| 20 | TiO2 | 66.03 | ~ | 166.03 |
| 21 | SiO2 | 119.65 | ~ | 219.65 |
| 22 | TiO2 | 58.25 | ~ | 158.25 |
| 23 | SiO2 | 118.3 | ~ | 218.3 |
| 24 | TiO2 | 23.8 | ~ | 123.8 |
| 25 | SiO2 | 92.23 | ~ | 192.23 |
| 26 | TiO2 | 19.17 | ~ | 119.17 |
| 27 | SiO2 | 129.84 | ~ | 229.84 |
| 28 | TiO2 | 50.85 | ~ | 150.85 |
| 29 | SiO2 | 121.85 | ~ | 221.85 |
| 30 | TiO2 | 53.15 | ~ | 153.15 |
| 31 | SiO2 | 119.64 | ~ | 219.64 |
| 32 | TiO2 | 17.04 | ~ | 117.04 |
| 33 | SiO2 | 119.64 | ~ | 219.64 |

SECOND REINFORCING LAYER
(REINFORCING LONG
WAVELENGTH REGION)
(103)

SECOND HALF-
WAVELENGTH SPACER
(105)

MAIN REFLECTIVE LAYER
(102)

FIRST HALF-
WAVELENGTH SPACER
(104)

FIRST REINFORCING LAYER
(REINFORCING SHORT
WAVELENGTH REGION)
(101)

Angle dependence Reflect Mirror

——·——·—— 0deg
------------------- 20deg
——···——···— 40deg
—·——·——·— 60deg
——————— 80deg High Reflectance : S = 3, 5, 10

Wavenumber(cm−1)

—————————— 0deg
—————————— 45deg p-pol

Wavelength(nm)

$\dfrac{\lambda}{2}$ hole at $\dfrac{\lambda_1 + \lambda_2}{2}$

————————— basic design (AOI 45deg)
— — — — — — 1st assist group (2pairs)
————————— 2nd assist group (2pairs)
—·—·—·—·—·— 1st assist group (7pairs)
—··—··—··—·· 2nd assist group (7pairs)
————————— assist group (2pairs)
- - - - - - - - - assist group (7pairs)

Broad Band Reflect Mirror

| | |
|---|---|
| ——·——·—— | 0deg |
| ———————— | 20deg |
| ——··——··—— | 40deg |
| ——·——·——·— | 60deg |
| ———————— | 80deg |

——·——·——·—— PRESENT DISCLOSURE
——·———·——— COMPARATIVE EXAMPLE 1
————————— COMPARATIVE EXAMPLE 2
——··——··—— COMPARATIVE EXAMPLE 3
----------------- COMPARATIVE EXAMPLE 4

INFRARED REFLECTOR FOR LIDAR

CROSS REFERENCE TO RELATED APPLICATIONS

This application claims priority to Korean Patent Application No. 10-2022-0050288, filed on Apr. 22, 2022, which is incorporated herein by reference in its entirety.

BACKGROUND

Field

The present disclosure relates to an infrared reflector which is one of the LIDAR components for autonomous driving.

Description of Related Art

A light detection and ranging (LIDAR) device for autonomous driving calculates a distance by measuring the 'position' at which a near-infrared laser beam collides with a target (a person, an object, etc.) and the 'time' it takes for the near-infrared laser beam to return back to a sensor after colliding with the target (Time of Flight).

In this case, a 'viewing angle' required for autonomous driving needs to be ensured by controlling a near-infrared ray by means of an optical system so that the near-infrared ray is 'bent', 'enlarged', and 'narrowed'. A reflector performs this function.

The reflector in the related art has been used to maximize a degree of integration of light by reflecting visible light mainly emitted from a lighting device such as a headlamp. This is because lighting performance is improved as reflectance increases and a loss of light caused by absorption/scattering decreases.

Metal such as magnesium or aluminum is mainly used as a material of a lamp reflector for a vehicle. For this reason, the lamp reflector made of a metallic material has a limitation in implementing design thereof through a die casting process, and productivity is low, such that the price of the reflector is high even though the material costs are low.

Therefore, a plastic injection-molded product on which a material such as aluminum having high reflectance is deposited in a single layer has been used to increase reflectance in a region of a visible light band of 350 to 750 nm.

However, because the LIDAR component for autonomous driving uses a near-infrared ray having a wavelength in a band of 905 nm as a main light source, the material is not suitable to reflect the visible light emitted from the headlamp. In the region of visible light, the reflectance of aluminum is approximately the second half of 80% to 90% or more, but the reflectance significantly decreases in 905 nm. In contrast, gold and silver have high reflectance close to 98% in the band of the near-infrared ray, but there is a problem in that the reflectance deteriorates because gold is high in price and silver is easily oxidized in the air.

The LIDAR is a component using a time-of-flight method of measuring a distance from an object by using the time it takes for an infrared ray emitted from a LIDAR component to return back to the LIDAR component after colliding with the object. The LIDAR uses an infrared laser as a light source and emits light with a wavelength of 905 nm.

According to a result of analyzing reflectors for LIDARs in the related art, i.e., reflectors for LIDARs commercially available for other industries other than industries related to vehicles such as doors for subway trains, it can be seen that in a case in which aluminum having high reflectance is deposited and a $SiO_2$ protective film is deposited in two layers on an upper end of aluminum in order to avoid oxidation of aluminum, the reflectance varies in a wavelength of 905 nm depending on an angle of light entering a surface of the reflector (at a level of 86% at an incident angle of 5° and 88% at an incident angle of 30°).

This is caused by an influence of two oxide deposition layers deposited on Al. There is a problem in that the change in reflectance according to the incident angle causes a change in signal in the LIDAR component.

A solution for simply increasing the number of oxide deposition layers may be considered to obtain an effect of increasing reflectance, but there is a problem in that the reflectance is significantly changed according to the incident angle instead of the increase in reflectance. Likewise, this causes a significant change in LIDAR signal and has an adverse effect on the key quality of LIDAR performance required for autonomous driving in expressways and autonomous driving in downtown (the LIDARs, which are being mass-produced actually, have a limited LIDAR guaranteed speed in traveling of 60 Km, such that autonomous driving in expressways is impossible).

Therefore, the metal deposition layer causes absorption of light by free electrons and thus has a limitation in being used for a reflector with high reflectance.

Meanwhile, a scanning LIDAR defines a viewing angle called a field of view (FOV), i.e., an angle made by entering laser beams and a rotation of the reflector connected to a motor. The LIDARs having a horizontal viewing angle of about 140 degrees are being mass-produced.

As illustrated in FIG. 1, assuming that the laser beams enter the reflector at angles of θ1 and θ2, the incident angle of θ2 is larger than the incident angle of θ1 with respect to a reference angle of 0° at which the laser beam enters the reflector perpendicularly. In this case, as the incident angle increases, the reflectance of the reflector decreases to that extent, such that signal sensitivity of the LIDAR deteriorates. The deterioration in reflectance means the amount of light that is lost without being used as LIDAR signals because of absorption/scattering of the laser beams.

Therefore, a distance difference occurs, in which the laser beams reflected by the reflector propagate far depending on the incident angle. The intensity of the signal returned back to the LIDAR is used to display the sensitivity through signal processing, and as a result, the sensitivity of the signal deteriorates in the region in which the incident angle increases and the reflectance deteriorates.

The above information disclosed in this Background section is only for enhancement of understanding of the background of the invention and therefore it may contain information that does not form the prior art that is already known in this country to a person of ordinary skill in the art.

SUMMARY

Accordingly, an object of the present disclosure considering the above point is to provide an infrared reflector for a LIDAR, which may have high reflectance and be independent of an incident angle, i.e., have reflectance that does not vary depending on the incident angle.

As a preferred embodiment, the present disclosure provides an infrared reflector for a LIDAR, the infrared reflector including a substrate, and a multilayer dielectric film deposited on the substrate, in which the multilayer dielectric film includes a first plurality of low-refractive layers each having a relatively lower refractive index than a high-refractive layer, and a second plurality of low-refractive layers each having a relatively lower refractive index than the low-refractive layer, and the first plurality of low-refractive layers and the second plurality of low-refractive layers are alternately and repeatedly stacked.

Further, the low-refractive layer may be made of $SiO_2$, and the high-refractive layer may be made of $TiO_2$.

In addition, the multilayer dielectric film has 30 layers or more.

In this case, a thickness of the multilayer dielectric film may be 3.0 μm to 6.0 μm.

In addition, the substrate may be optical glass, and a thickness of the optical glass may be 0.5 mm to 25 mm.

Further, a refractive index of the optical glass may be 1.52 to 1.55.

In addition, the number of layers of the multilayer dielectric film may be an odd number.

Meanwhile, a first layer of the multilayer dielectric film deposited on the optical glass may be the low-refractive layer and have a thickness of 188 nm to 288 nm.

Further, an uppermost layer of the multilayer dielectric film may be the low-refractive layer and have a thickness of 119 nm to 220 nm.

As another embodiment, the present disclosure provides an infrared reflector for a LIDAR, the infrared reflector including a substrate, and a multilayer dielectric film deposited on the substrate and including a plurality of $SiO_2$ deposition layers and a plurality of $TiO_2$ deposition layers, in which the multilayer dielectric film includes a main reflective layer for reflection in a region with a center wavelength, a first reinforcing layer deposited on the substrate and configured to reinforce reflection in a region with a wavelength shorter than the center wavelength, and a second reinforcing layer stacked on the main reflective layer stacked on the first reinforcing layer and configured to reinforce reflection in a region with a wavelength longer than the center wavelength.

Further, the main reflective layer may be made by alternately and repeatedly stacking the $SiO_2$ deposition layers and the $TiO_2$ deposition layers, and may be provided as 6 to 10 pairs of deposition layers, the pairs each including the $SiO_2$ deposition layer and the $TiO_2$ deposition layer.

In addition, the first reinforcing layer may be made by alternately and repeatedly stacking the $SiO_2$ deposition layers and the $TiO_2$ deposition layers, and may be provided as 3 to 5 pairs of deposition layers, the pairs each including the $SiO_2$ deposition layer and the $TiO_2$ deposition layer.

Further, the second reinforcing layer may be made by alternately and repeatedly stacking the $SiO_2$ deposition layers and the $TiO_2$ deposition layers, and may be provided as 3 to 5 pairs of deposition layers, the pairs each including the $SiO_2$ deposition layer and the $TiO_2$ deposition layer.

Further, a thickness of the $SiO_2$ deposition layer constituting the second reinforcing layer may be larger than a thickness of the $SiO_2$ deposition layer constituting the first reinforcing layer.

Meanwhile, the infrared reflector may further include a first half-wavelength spacer stacked between the first reinforcing layer and the main reflective layer and made of $SiO_2$, and a second half-wavelength spacer stacked between the main reflective layer and the second reinforcing layer and made of $SiO_2$.

In particular, a thickness of the multilayer dielectric film may be 3.0 μm to 6.0 μm.

In addition, the substrate may be optical glass having a refractive index of 1.52 to 1.55.

Further, a first layer of the first reinforcing layer deposited on the optical glass may be the $SiO_2$ deposition layer.

According to the infrared reflector for a LIDAR according to the present disclosure, it is possible to maintain the reflectance independently of the incident angle in the near-infrared band and thus maintain high reflectance even at a large incident angle, thereby ensuring the LIDAR signal sensitivity.

BRIEF DESCRIPTION OF THE FIGURES

FIG. 4 is a view specifically organizing a multilayer dielectric film of the reflector according to the present disclosure.

DETAILED DESCRIPTION

Hereinafter, embodiments of the present disclosure will be described in detail with reference to the exemplary accompanying drawings, and since these embodiments, as examples, may be implemented in various different forms by those skilled in the art to which the present disclosure pertains, they are not limited to the embodiments described herein.

In order to sufficiently understand the present disclosure, advantages in operation of the present disclosure, and the object to be achieved by carrying out the present disclosure, reference needs to be made to the accompanying drawings for illustrating an exemplary embodiment of the present disclosure and contents disclosed in the accompanying drawings.

Further, in the description of the present disclosure, the repetitive descriptions of publicly-known related technologies will be reduced or omitted when it is determined that the descriptions may unnecessarily obscure the subject matter of the present disclosure.

Figure 1:
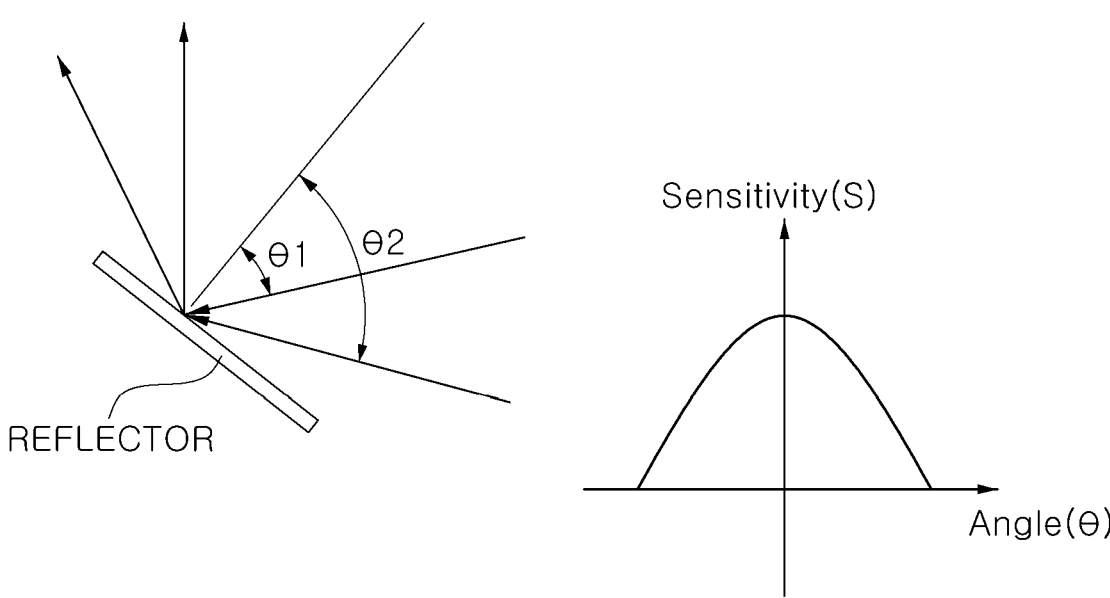
FIG. 1 is a view illustrating a relationship between an incident angle and signal sensitivity.
Figure 2:
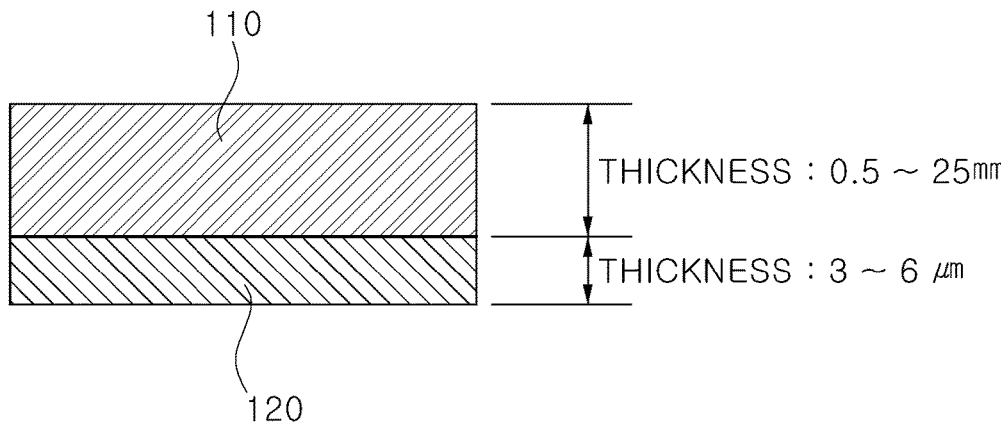
FIG. 2 is a view schematically illustrating a reflector according to the present disclosure.
Figure 3:
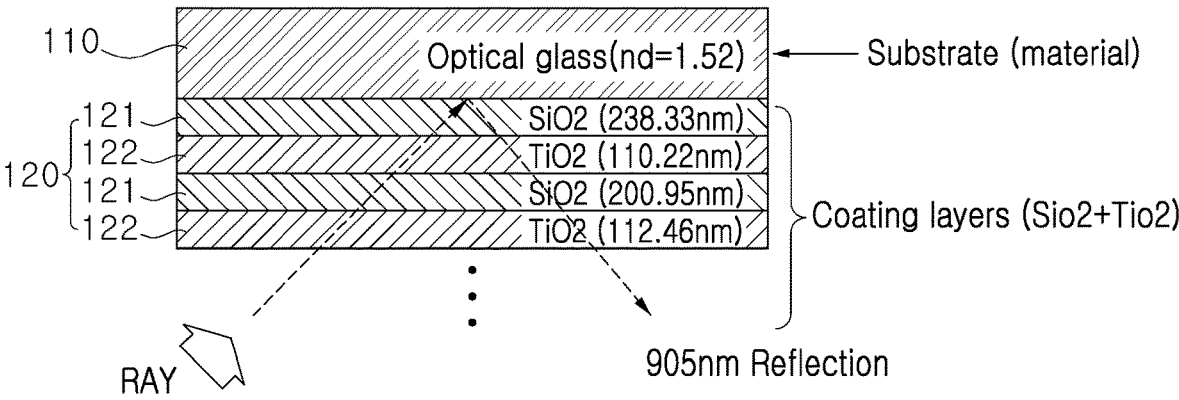
FIG. 3 is a view specifically illustrating the reflector according to the present disclosure.
Figure 5:
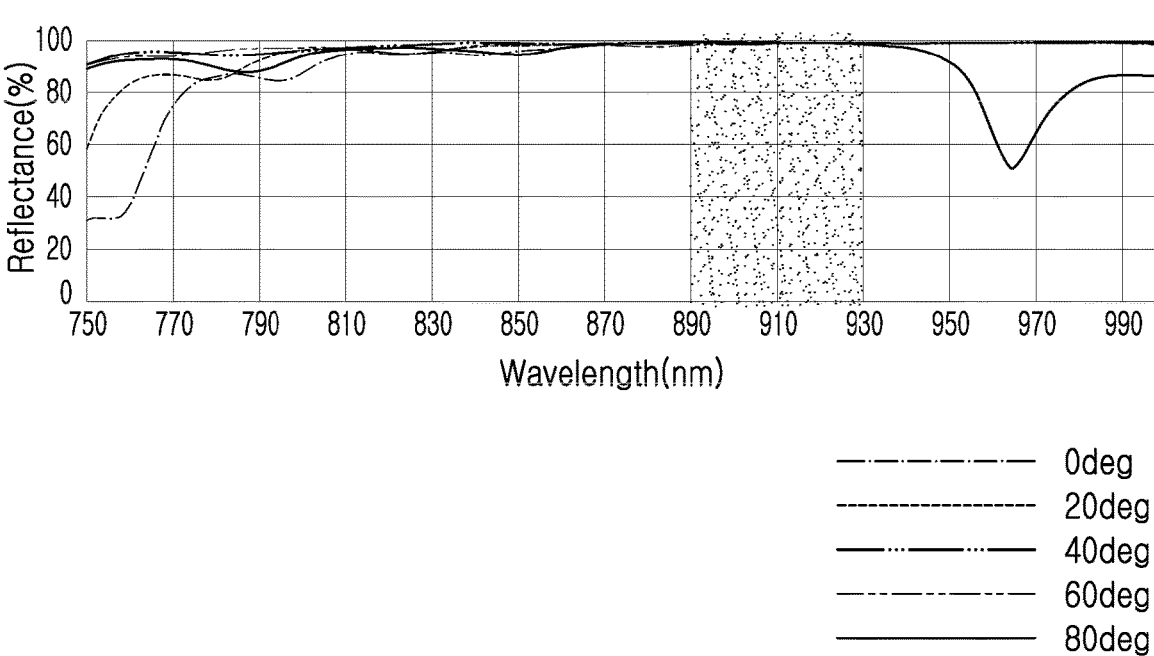
FIG. 5 is a view illustrating reflectance according to an incident angle in the reflector according to the present disclosure.

FIG. 2 is a schematic view of a reflector according to the present disclosure, and FIG. 3 is a view illustrating a specified reflector according to the present disclosure. Further, FIG. 4 is a view specifically organizing a multilayer dielectric film of the reflector according to the present disclosure, and FIG. 5 is a view illustrating reflectance according to an incident angle in the reflector according to the present disclosure.

Hereinafter, an infrared reflector for a LIDAR according to an embodiment of the present disclosure will be described with reference to FIGS. 2 to 5.

The present disclosure relates to a reflector for a LIDAR that has high reflectance and is independent of an incident angle (the reflectance does not vary depending on the incident angle) while overcoming the limitation in the related art in that the reflectance inevitably decreases when the incident angle is large.

The reflector for a LIDAR according to the present disclosure includes a substrate 110 and a multilayer dielectric film 120 made by depositing multiple dielectric deposition layers as reflective layers. The multilayer dielectric film 120 includes a plurality of low-refractive layers 121, 122 each having a relatively low refractive index and a plurality of high-refractive layers each having a relatively high refractive index, and the low-refractive layers and the high-refractive layers are alternately and repeatedly stacked.

The low-refractive layer may be made of $SiO_2$, and the high-refractive layer may be made of $TiO_2$.

Optical glass may be applied as the substrate 110 that serves to reflect laser beams with a band of 905 nm in the LIDAR component. The multilayer dielectric film 120 may be provided on one or both surfaces of the substrate 110.

The deposition surface of the optical glass has a structure on which the low-refractive layers ($SiO_2$) and the high-refractive layers ($TiO_2$) are repeatedly stacked. A total number of deposition layers for reflection design according to the incident angle may be 30 to 50.

Further, an overall deposition thickness may be 3.0 µm to 6.0 µm. A thickness of the optical glass may be 0.5 mm (t) to 25 mm (t).

The optical glass, which is the substrate 110, includes N-BK, N-K5, and the like with a refractive index of Nd=1.52. High reflectance cannot be implemented because of a loss of light when general glass is used.

In addition, because it is important for the optical glass to have a refractive index matching with the multilayer dielectric film 120, the optical glass is limited to optical glass having a value of the refractive index of 1.52 to 1.55.

In particular, a first layer of the multilayer dielectric film 120 deposited on the substrate 110 may be a low-refractive layer. That is, the first layer needs to be a $SiO_2$ layer. If a $TiO_2$ layer is placed first, performance in attaching the substrate deteriorates, and the layer may be separated in a severe environment with a high temperature, a high humidity, a thermal shock, and the like. A thickness may be 188 nm to 288 nm. An uppermost layer into which light is introduced needs to be a low-refractive layer, i.e., a $SiO_2$ deposition layer, and the thickness thereof may be 119 nm to 220 nm.

Therefore, the multilayer dielectric film 120 according to the present disclosure may be made by alternately and repeatedly stacking the low-refractive layers and the high-refractive layers having different refractive indexes. For this reason, the number of layers of the multilayer dielectric film 120 may be an odd number.

FIG. 4 is a view illustrating 33 layers. Further, the thickness of each deposition layer is optimized in consideration of reflection efficiency of the entire multilayer dielectric film 120.

The thickness of each deposition layer is within a range shown in FIG. 4. In this case, the reflector according to the present disclosure may serve as a reflector that is independent of the incident angle and has high reflectance.

Meanwhile, as shown in FIG. 4, depending on functionality, the multilayer dielectric film 120 according to the present disclosure may include a first reinforcing layer 101, a main reflective layer 102, a second reinforcing layer 103, a first half-wavelength spacer 104, and a second half-wavelength spacer 105.

The first reinforcing layer 101 is a layer for reinforcing reflection of a short wavelength region according to an angle (for filling a wavelength hole as described below). The first reinforcing layer 101 may be provided as 3 pairs or more and 5 pairs or less of deposition layers, the pairs each including one low-refractive layer and one high-refractive layer.

The second reinforcing layer 103 is a layer for reinforcing reflection of a long wavelength region according to an angle. The second reinforcing layer 103 may be provided as 3 pairs or more and 5 pairs or less of deposition layers, the pairs each including one low-refractive layer and one high-refractive layer.

Further, a thickness of each of the low-refractive layers of the second reinforcing layer 103 needs to be larger than a thickness of each of the low-refractive layers of the first reinforcing layer 101, and a thickness of each of the high-refractive layers of the second reinforcing layer 103 needs to be larger than a thickness of each of the high-refractive layers of the first reinforcing layer 101.

The main reflective layer 102 is a layer for reinforcing reflection performance of a center wavelength region to be achieved by the present disclosure. The main reflective layer 102 may be provided as 6 pairs to 10 pairs of deposition layers, the pairs each including one low-refractive layer and one high-refractive layer.

In addition, the first half-wavelength spacer 104 and the second half-wavelength spacer 105 are respectively disposed between the first reinforcing layer 101 and the main reflective layer 102 and between the main reflective layer 102 and the second reinforcing layer 103. The first and second half-wavelength spacers 104 and 105 are made of $SiO_2$.

As shown in FIG. 5, the result according to the present disclosure configured as described above may ensure the reflectance of 95%, more particularly, 99% or higher within a wide range of a wavelength of 860 nm to 940 nm with respect to the light emitted at an incident angle of 0 to 80°. The laser beam is changed in wavelength of maximum □30 nm depending on the temperature. Therefore, a range of wavelength is significantly important for reflectance. Even if the reflectance of 90% or higher is required, an available range of wavelength may be extended to 800 nm to 950 nm.

In summary, the present disclosure provides a material and configuration which have not been known up to now and may maintain the reflectance of 99% or higher of light at a large incident angle and in a wide wavelength band.

Therefore, the present disclosure having a small loss of light according to the incident angle may be properly applied to a reflector requiring a wide viewing angle such as a LIDAR sensor for autonomous driving.

The reflectance at 905 nm and □20 shown in Table 5 are organized in the following Table 1.

TABLE 1

| Classification | Incident Angle (deg) | | | | |
|---|---|---|---|---|---|
| | 0 | 20 | 40 | 60 | 80 |
| Reflectance (%, at 905 ± 20 nm) | 99.65 | 99.68 | 99.90 | 99.39 | 99.43 |

The principle in which the object is achieved by the configuration of the present disclosure will be described with reference to FIGS. 6 to 8.

Dielectric reflection coating follows the following basic design form. H represents a refractive index of a high-refractive material, L represents a refractive index of a low-refractive material, and S represents a repeated power of squares.

$$[Air|L(HL)^8|Glass] \qquad \text{Expression 1}$$

Figure 6:
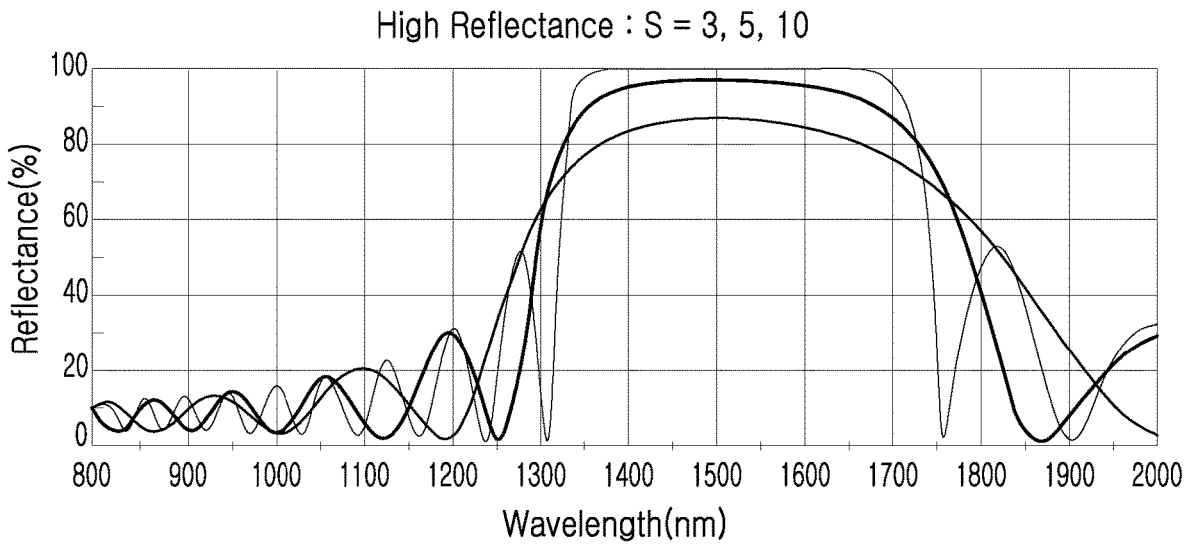
FIGS. 6, 7, and 8 are views for explaining the reflector according to the present disclosure.

In this case, as shown in FIG. 6, as S increases, the reflectance increases, and dielectric reflection coating has sharp cut-on and cut-off. A sharp curved line is shown as S increases with respect to S=3, 5, and 10 in three graphs.

In this case, a band gap is calculated on the basis of refractive indexes of a high-refractive index substance and a low-refractive index substance.

$$\text{Bandwidth: } \frac{\Delta\lambda}{\lambda} = \frac{4}{\pi} \arcsin\left(\frac{n_H - n_L}{n_H + n_L}\right) \qquad \text{Expression 2}$$

Therefore, the multilayer dielectric film according to the present disclosure is made by repeatedly stacking the low-refractive layers and the high-refractive layers.

Figures 7, 8:
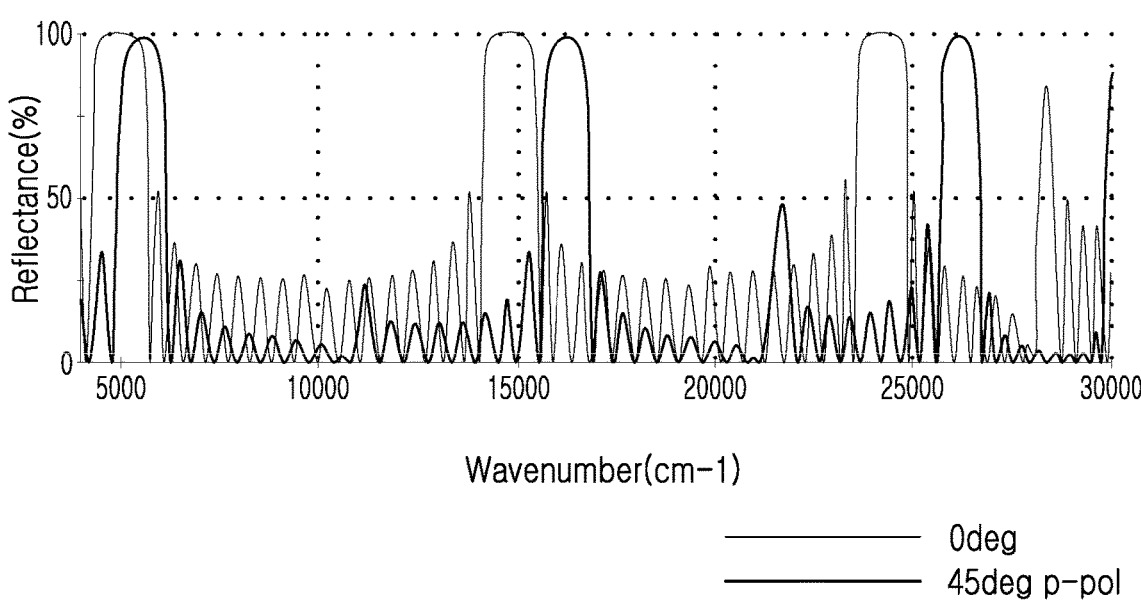

Next, as shown in FIG. 7, as the incident angle increases, the reflection band is shifted to a short wavelength.

Therefore, as shown in FIG. 8, a range of reflection wavelength needs to be wider than a required range of wavelength to maintain the reflectance at a large incident angle. This configuration needs to be designed by connecting L(HL)s structures having different reference wavelengths. In this case, an average part of the two reference wavelengths needs to fill a half-wavelength hole by adding the low-refractive substance layers.

When a long wavelength is made by mixing mirrors having two different types of reference wavelengths, the hole in the two superimposed regions may be blocked only when a low-reflectance spacer having a half-wavelength thickness of an average wavelength of the two reference wavelengths is inserted between the two mirror groups.

For this reason, the multilayer dielectric film according to the present disclosure requires the spacers and needs to have 30 layers or more to obtain desired reflectance.

Figure 9:
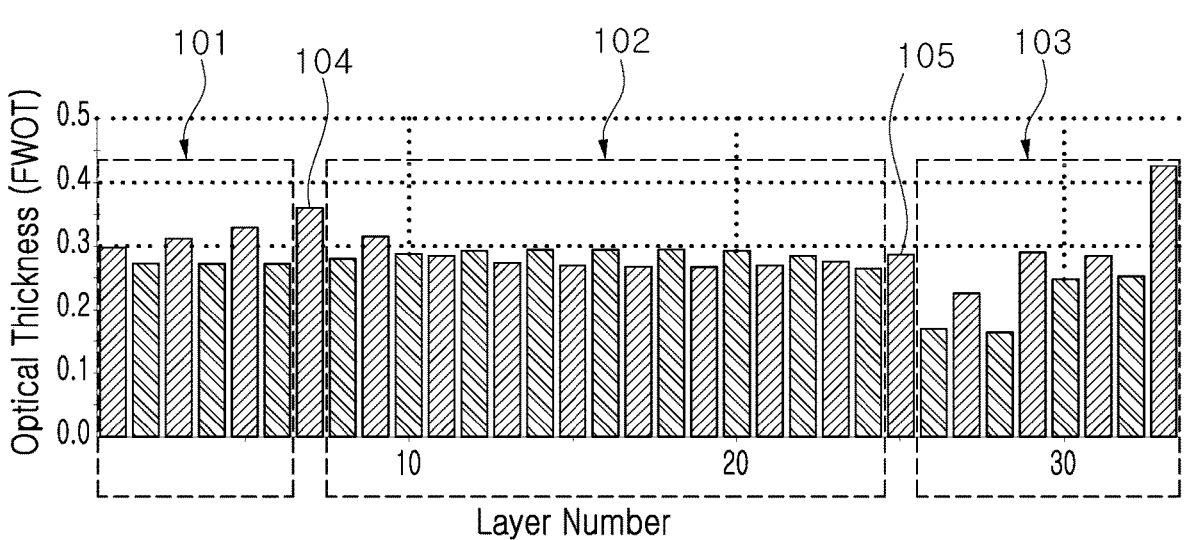
FIG. 9 is a view illustrating the reflector according to the present disclosure according to studies illustrated in FIGS. 6 to 8.

Therefore, in the embodiment of the present disclosure, the multilayer dielectric film having the 33 layers with the optimized thickness may be manufactured, and the classification shown in FIG. 4 may be shown again in FIG. 9.

The first and second reinforcing layers 101 and 103 are layers including pairs for reinforcing the reflectance according to the angle shift, and the main reflective layer 102 is a main mirror layer.

In this case, it can be seen that the each part requires 3 pairs or more of HL layers, and the main reflective layer 102 requires 8 pairs or more of HL layers.

Therefore, the multilayer dielectric film according to the present disclosure may include 30 layers or more.

The reason will be described with reference to the result shown in FIG. 10.

Figure 10:
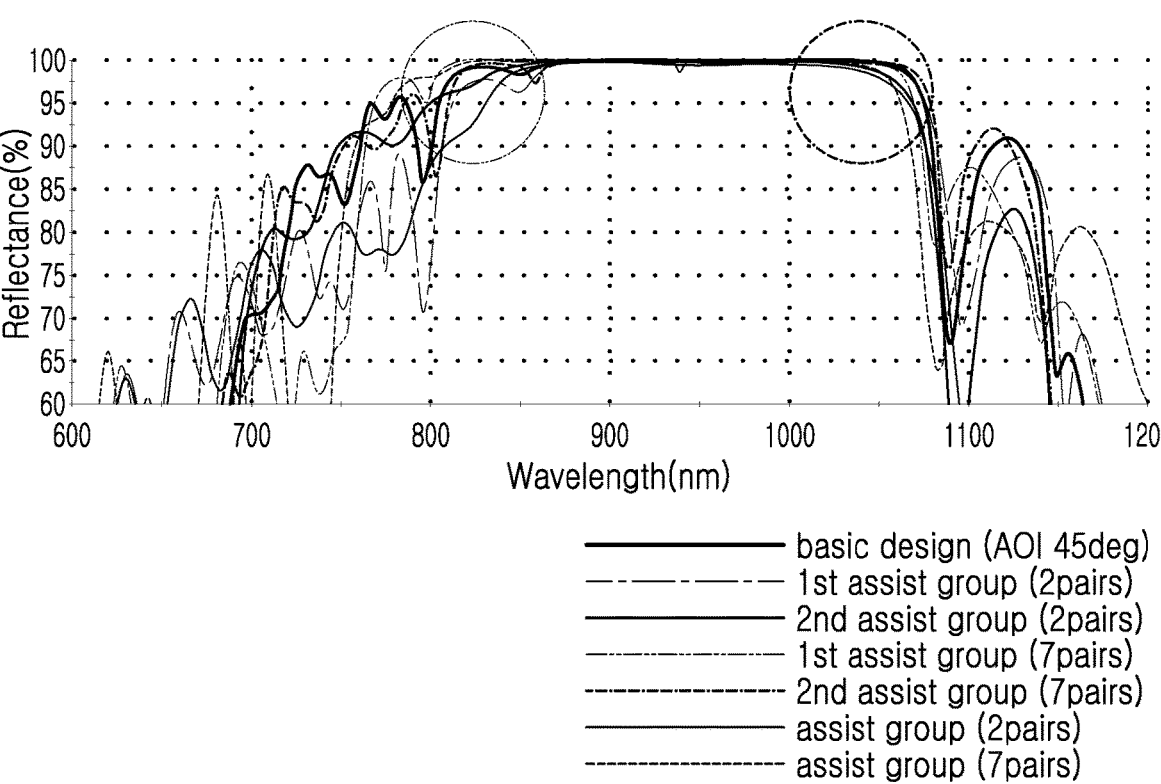
FIG. 10 is a view illustrating reflectance according to incident angles according to the present disclosure and comparative examples.

The basic design shown in FIG. 10 corresponds to the present disclosure having the 33 layers in which 1st assist group means the first reinforcing layer, 2nd assist group means the second reinforcing layer, pair means HL pairs, and the other layers remain the same.

It can be ascertained that there is a change in the part indicated by a circle (shoulder part).

It can be ascertained that the reflectance decreases in comparison with the present disclosure when the reinforcing layer is provided as two pairs of layers, suggesting that the reflectance decreases (in the vicinity of 800 nm to 850 nm) when the incident angle is shifted.

Further, it can be ascertained that, when the reinforcing layer is provided as seven pairs of layers, the reflection wavelength bandwidth of the current design decreases.

As shown in FIG. 10, it can be ascertained that if the reinforcing layer is not appropriately designed, the shoulder part collapses. This phenomenon greatly affects a reduction in reflectance and reduces a high-reflectance wavelength bandwidth when an angle of a near-infrared ray entering the reflector to make the LIDAR viewing angle is changed. The decrease in reflectance causes deterioration in LIDAR sensitivity.

Hereinafter, comparative examples compared to the components of the present disclosure will be described with reference to FIGS. 11 to 15.

Figure 11:
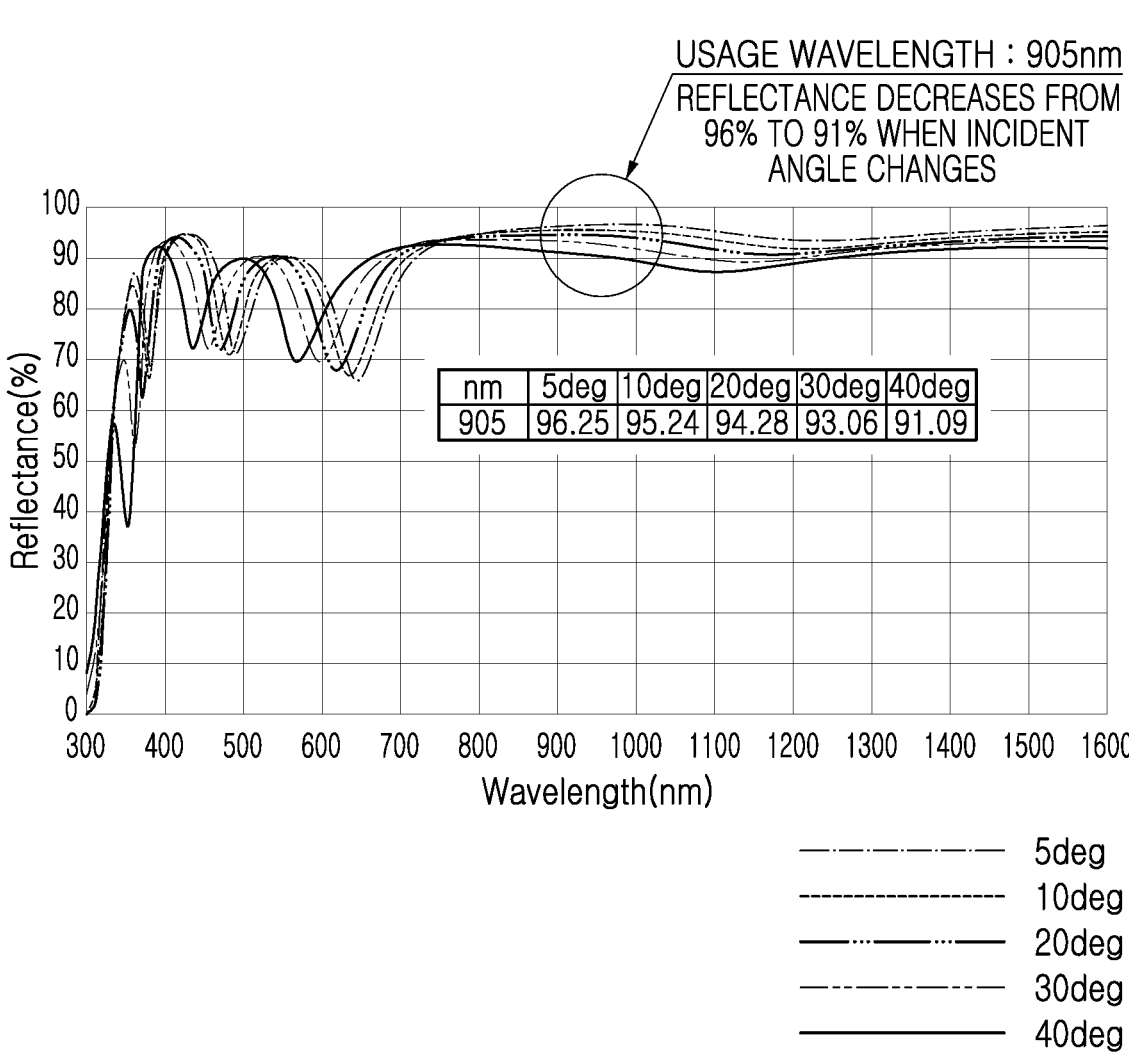
FIGS. 11, 12, 13, 14, and 15 are views illustrating experimental results according to comparative examples.

FIG. 11 illustrates a reflectance test result of Comparative Example 1 having an Al metal film and four $SiO_2/TiO_2$ layers (thickness of 600 nm) using a metal film instead of optical glass.

Al metal having reflectance of less than 90% has a limitation in increasing the reflectance. In addition, because the Al metal has a problem with metal oxidation, such metal oxide deposition layers are provided on the Al metal film and serves to protect oxidation of aluminum.

However, because the reflectance greatly decreases according to the incident angle in Comparative Example 1, the performance of the lidar sensor, which needs to make a large viewing angle, may deteriorate. That is, detection of an object is further degraded in a region in which a viewing angle is large than in a region in which a viewing angle is small.

The reflectance decreases from 96% to 91% when the usage wavelength is 905 nm.

Figure 12:
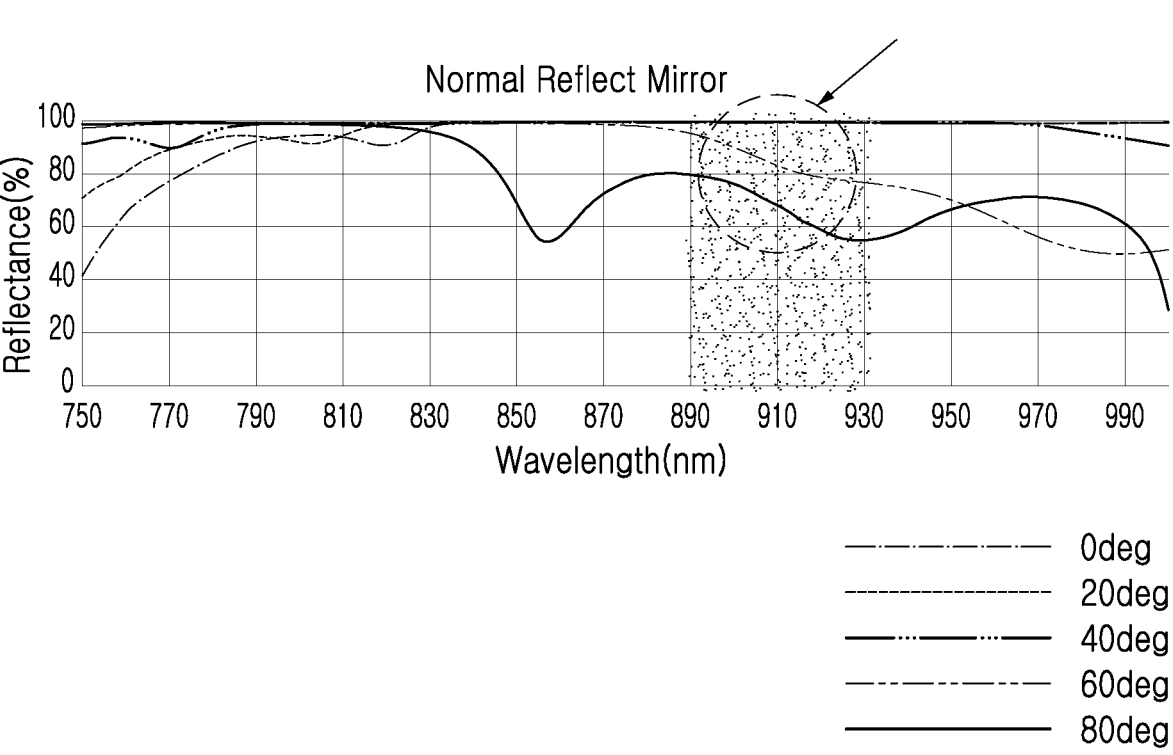

Next, FIG. 12 shows a reflectance result of Comparative Example 2 having a first layer made of $TiO_2$ instead of the component of the present disclosure.

If the $TiO_2$ is formed first on a substrate, the reflectance rapidly decreases in the vicinity of a wavelength of 905 □20 nm when an incident angle is 60° or more. In this case, reflectance with the wavelength of 905 nm is at a level of about 70%, and a great loss of light occurs, suggesting that this configuration is insufficient for use as the lidar reflector. That is, the reflectance was 87.15 at 60 degrees and 70.33 at 80 degrees.

The structure made by repeatedly stacking the SIO2 and TiO2 layers has about 28 layers, and a total thickness thereof is 4,797 nm.

Even though the multilayer film is made, a material having a refractive index similar to that of the optical glass needs to be formed, as a first layer, immediately on the substrate.

This configuration greatly affects the decrease in reflectance when the incident angle is large.

Figure 13:
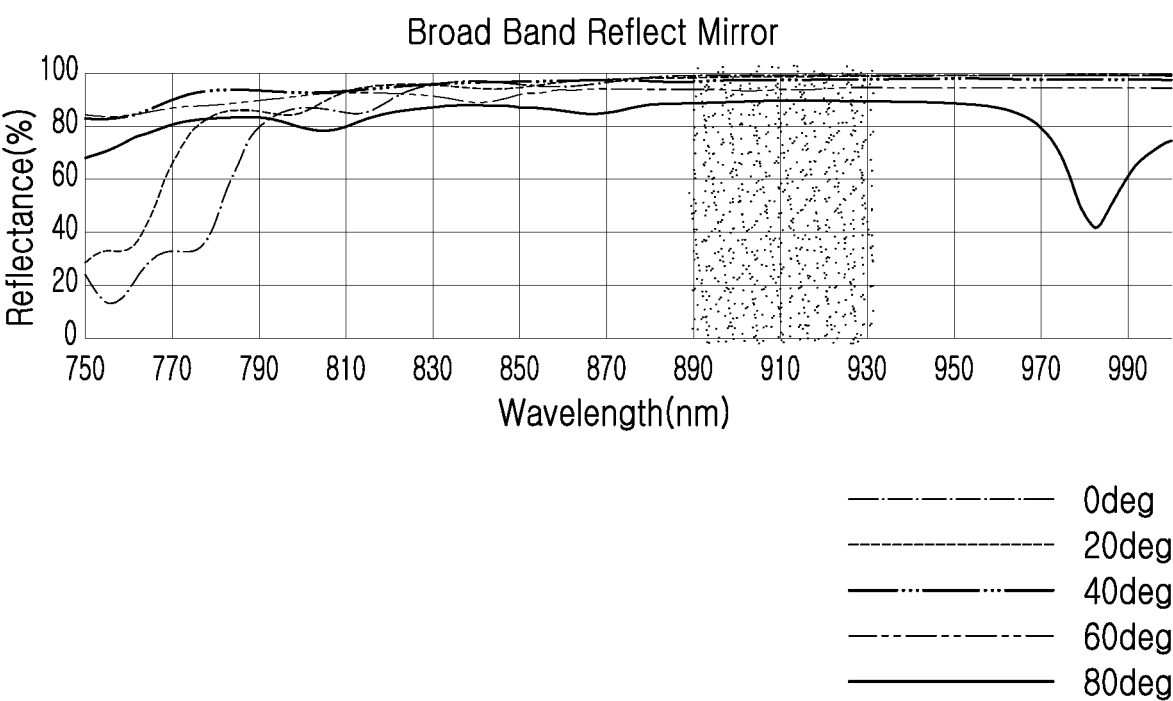

Next, FIG. 13 shows a result of Comparative Example 3 whose thickness is not optimized unlike the present disclosure.

In this configuration, a $SiO_2$ deposition layer, as a first layer, is placed on optical glass, and the SiO2 deposition layers and $TiO_2$ deposition layers are repeatedly formed. The number of deposition layers is 33, which is equal to the number of layers according to the present disclosure. However, an overall thickness of the deposition layers is 5,852 nm, which is larger than that of the present disclosure, and the thickness of each of the layers is different from that of the present disclosure.

Therefore, when the evaluation of reflectance according to the incident angle is performed, the reflectance decreases to 89% at the incident angles of 60° and 80°. That is, even though the dielectric film with 33 layers is made by repeatedly depositing layers equal in number to the layers of the present disclosure, Comparative Example 3 cannot achieve the reflectance of 99% or higher at the wavelength of 905 nm±20 nm which is achieved by the present disclosure.

Figure 14:
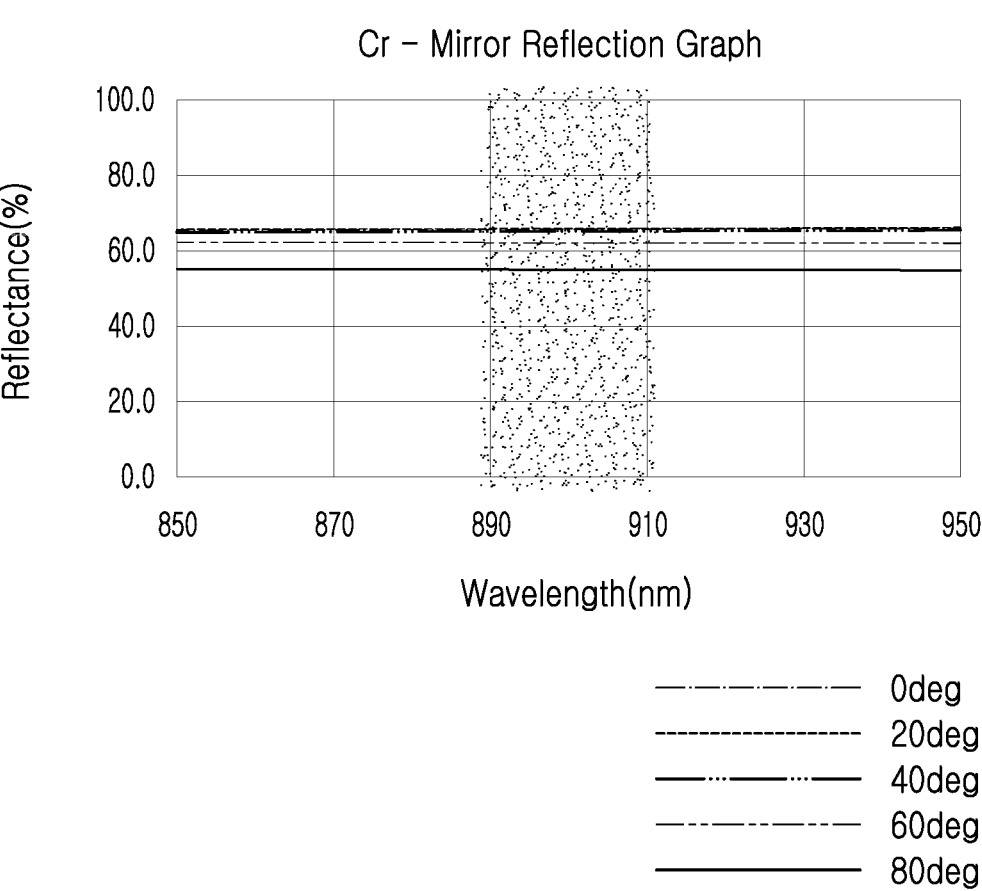
Figure 15:
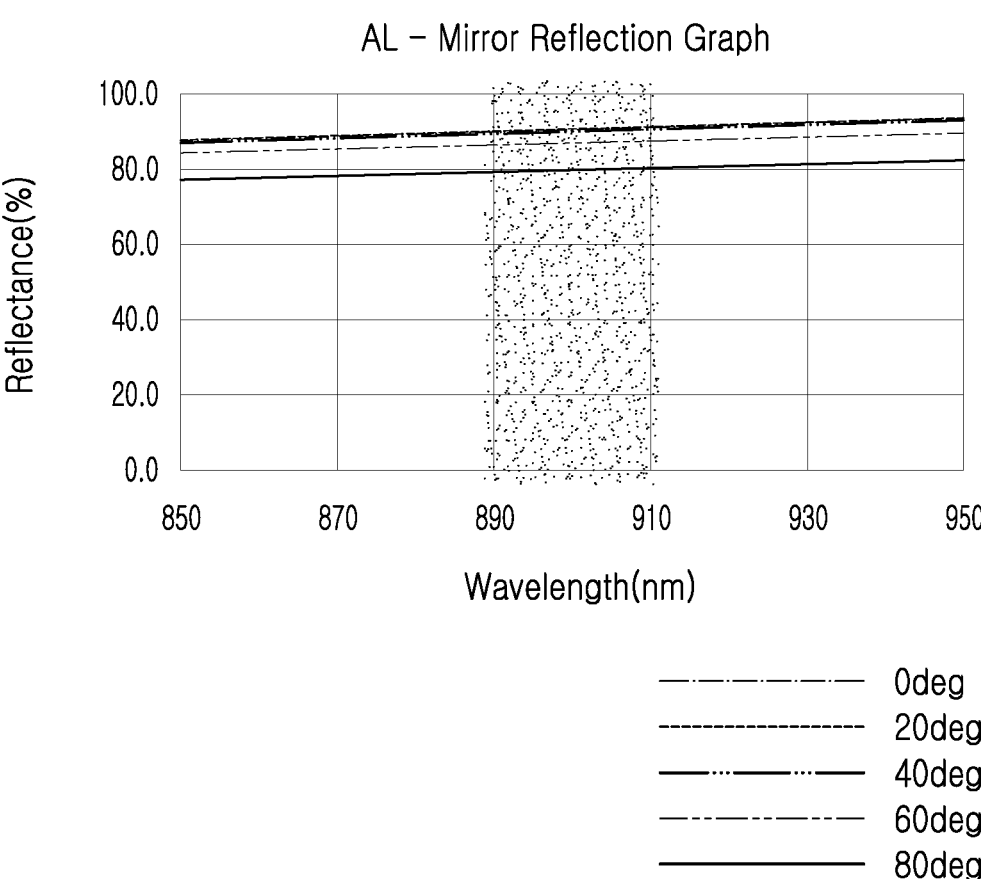

Next, FIG. 14 shows a result of Comparative Example 4 using Cr for a reflector, and FIG. 15 shows a result of Comparative Example 4 using Al for a reflector. When made of metal as described above, the reflector basically has low reflectance because of light absorption by free electrons. That is, the reflector is not suitable as a reflector for a LIDAR sensor that requires the reflectance of 95% or higher.

It has been ascertained that the influence of deterioration in reflectance according to the incident angle in comparison with the dielectric film is small.

Hereinafter, a result of comparing the present disclosure and Comparative Examples 1 to 4 by using actual LIDAR prototypes will be described.

Figure 16:
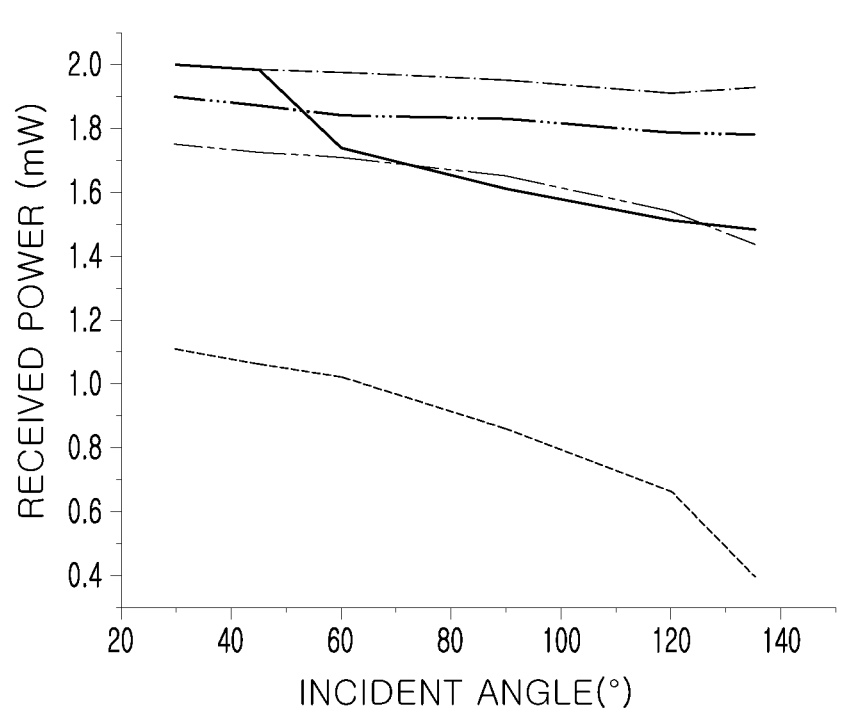
FIG. 16 is a view illustrating receiving power according to incident angles according to the present disclosure and comparative examples.

FIG. 16 shows an experimental result of calculating power of light when a near-infrared laser beam of 2 mW power and 905 nm is emitted and 'light' reflected by the reflector positioned at a distance of 1 m enters to a power meter.

The incident angle was changed to 30 degrees to 140 degrees by a rotating body positioned at a lower end of the reflector, and accordingly, a position of the optical power meter was also changed, and a loss of light based on the change in incident angle was calculated.

In the case of the multilayer dielectric film according to the present disclosure, the optical power tended to be maintained at 99% or higher even though the incident angle is changed. In the case of gold (Au) having similar performance, the optical power tended to be somewhat reduced because of light absorption of metal, and a loss of light occurred at an incident angle of 140 degrees. Even in the case of the metal film+the multilayer dielectric film like Comparative Example 1, a large amount of loss of light occurred by 10% or more because of light absorption of aluminum.

It can be seen that the present disclosure has the following effects implemented by the above-mentioned configurations.

The high-reflectance near-infrared reflector according to the present disclosure, which is independent of the incident angle, may minimize a loss of light even though the incident angle is changed from 0 degree to 140 degrees with respect to vertical incidence on the basis of a near-infrared optical signal (laser) of 905 nm.

When this configuration is actually applied to the LIDAR component, a loss of light caused by the reflector during a process of transmitting and receiving a signal may be minimized in a method of detecting an object using TOF, which makes it possible to improve light sensing performance. That is, the sensing performance of the LIDAR sensor required for autonomous driving is improved.

Figure 17:
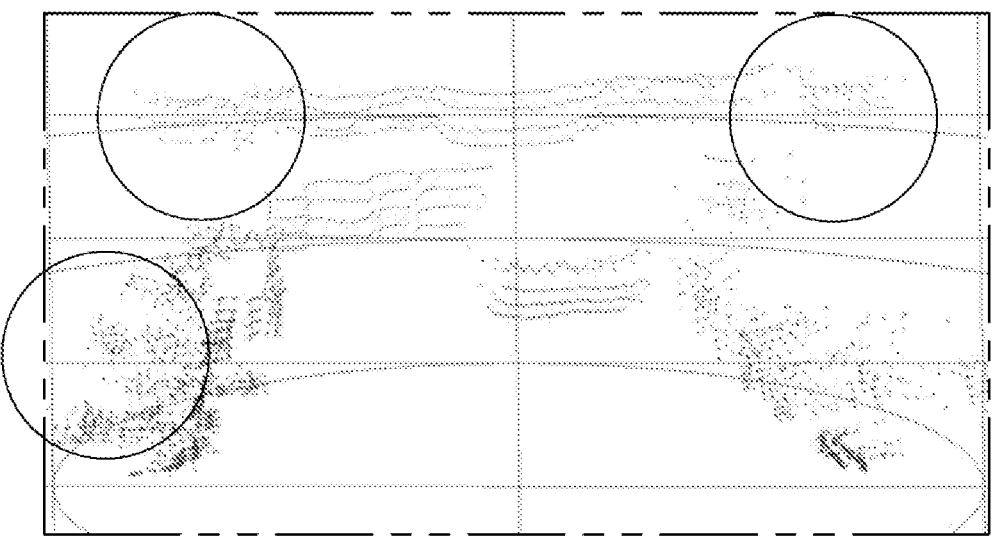
FIG. 17 is a view illustrating LIDAR receiving signals made by the reflector according to the present disclosure.
Figure 18:
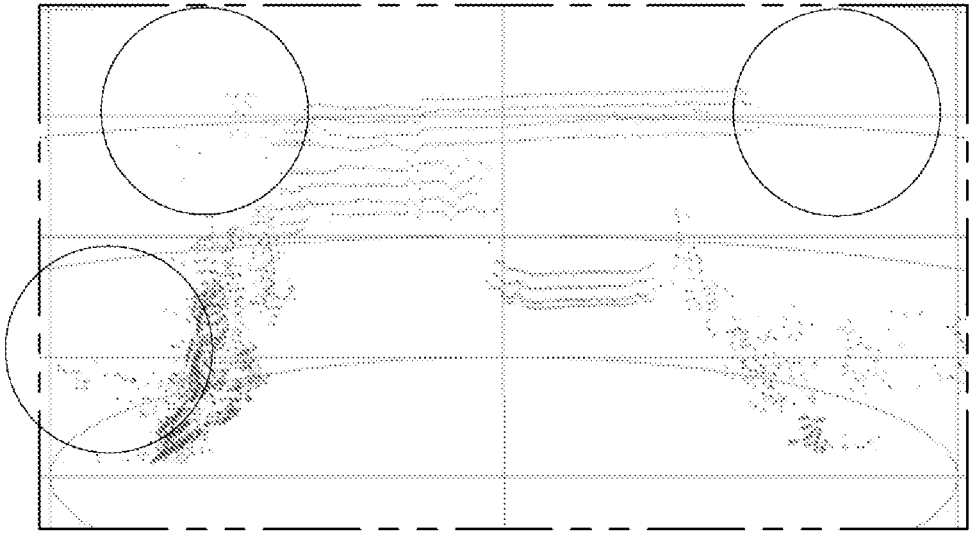
FIG. 18 is a view illustrating LIDAR receiving signals made by a reflector according to Comparative Example 1.

FIG. 17 is a view illustrating a LIDAR receiving signal made by the reflector according to the present disclosure, and FIG. 18 is a view illustrating a LIDAR receiving signal made by the reflector according to Comparative Example 1 and illustrating a signal detected when light collides with an object and returns. When the signal is weak because of a loss of light, no spot is shown.

It can be seen that when the reflector according to the present disclosure is applied, the loss of light is minimized even at a larger angle of view as described above, such that a signal is sensed as in the parts indicated by circles. In contrast, it can be seen that in the case of Comparative Example 1, the small number of signals are received at a large angle of view, and there are a number of points at which no signals are sensed. Accordingly, it can be seen that the present disclosure exhibits a clear difference in performance of the LIDAR sensor from Comparative Example 1 at a large angle of view.

While the present disclosure has been described with reference to the exemplified drawings, it is obvious to those skilled in the art that the present disclosure is not limited to the aforementioned embodiments, and may be variously changed and modified without departing from the spirit and the scope of the present disclosure. Accordingly, the changed or modified examples belong to the claims of the present disclosure and the scope of the present disclosure should be interpreted on the basis of the appended claims.

The invention claimed is:

1. An infrared reflector for a light detection and ranging LIDAR device, the infrared reflector comprising:
   a substrate; and
   a multilayer dielectric film deposited on the substrate;
   wherein the multilayer dielectric film comprises a plurality of low-refractive layers each having a lower refractive index than a high-refractive layer, and a plurality of high-refractive layers each having a higher refractive index than the first plurality of low-refractive layers, and the plurality of low-refractive layers and the plurality of high-refractive layers are alternately and repeatedly stacked; and
   wherein a first layer of the multilayer dielectric film deposited on the substrate is one of the low-refractive layers.

2. The infrared reflector of claim 1, wherein each of the plurality of low-refractive layers and each of the plurality of high-refractive layers is made of $SiO_2$, and the high-refractive layer is made of $TiO_2$.

3. The infrared reflector of claim 2, wherein the multilayer dielectric film has at least 30 layers.

4. The infrared reflector of claim 3, wherein a thickness of the multilayer dielectric film is 3.0 μm to 6.0 μm.

5. The infrared reflector of claim 3, wherein the substrate is optical glass, and a thickness of the optical glass is 0.5 mm to 25 mm.

6. The infrared reflector of claim 5, wherein a refractive index of the optical glass is 1.52 to 1.55.

7. The infrared reflector of claim 3, wherein the number of layers of the multilayer dielectric film is an odd number.

8. The infrared reflector of claim 5, wherein the first layer of the multilayer dielectric film deposited on the optical glass has a thickness of 188 nm to 288 nm.

9. The infrared reflector of claim 8, wherein an uppermost layer of the multilayer dielectric film is one of the low-refractive layers, and has a thickness of 119 nm to 220 nm.

10. An infrared reflector for a light detection and ranging LIDAR device, the infrared reflector comprising:
   a substrate; and
   a multilayer dielectric film deposited on the substrate and comprising a plurality of $SiO_2$ deposition layers and a plurality of $TiO_2$ deposition layers;
   wherein the multilayer dielectric film comprises:
   a main reflective layer for reflection in a region with a center wavelength;

a first reinforcing layer deposited on the substrate, and configured to reinforce reflection in a region with a wavelength shorter than the center wavelength; and a second reinforcing layer stacked on the main reflective layer stacked on the first reinforcing layer, and configured to reinforce reflection in a region with a wavelength longer than the center wavelength.

11. The infrared reflector of claim 10, wherein the main reflective layer is made by alternately and repeatedly stacking the $SiO_2$ deposition layers and the $TiO_2$ deposition layers, and is provided as 6 to 10 pairs of deposition layers, the pairs of deposition layers each comprising the $SiO_2$ deposition layer and the $TiO_2$ deposition layer.

12. The infrared reflector of claim 11, wherein the first reinforcing layer is made by alternately and repeatedly stacking the $SiO_2$ deposition layers and the $TiO_2$ deposition layers, and is provided as 3 to 5 pairs of deposition layers, the pairs of deposition layers each comprising the $SiO_2$ deposition layer and the $TiO_2$ deposition layer.

13. The infrared reflector of claim 12, wherein the second reinforcing layer is made by alternately and repeatedly stacking the $SiO_2$ deposition layers and the $TiO_2$ deposition layers, and is provided as 3 to 5 pairs of deposition layers, the pairs of deposition layers each comprising the $SiO_2$ deposition layer and the $TiO_2$ deposition layer.

14. The infrared reflector of claim 13, wherein a thickness of the $SiO_2$ deposition layer constituting the second reinforcing layer is larger than a thickness of the $SiO_2$ deposition layer constituting the first reinforcing layer.

15. The infrared reflector of claim 13, further comprising:

a first half-wavelength spacer stacked between the first reinforcing layer and the main reflective layer and made of $SiO_2$; and a second half-wavelength spacer stacked between the main reflective layer and the second reinforcing layer and made of $SiO_2$.

16. The infrared reflector of claim 13, wherein a thickness of the multilayer dielectric film is 3.0 μm to 6.0 μm.

17. The infrared reflector of claim 13, wherein the substrate is optical glass having a refractive index of 1.52 to 1.55.

18. The infrared reflector of claim 17, wherein a first layer of the first reinforcing layer deposited on the optical glass is the $SiO_2$ deposition layer.

* * * * *